US010262476B2

(12) United States Patent
Dudar (10) Patent No.: US 10,262,476 B2
(45) Date of Patent: Apr. 16, 2019

(54) STEERING OPERATION (71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 81 days.

(21) Appl. No.: 15/367,307

(22) Filed: Dec. 2, 2016

(65) Prior Publication Data

US 2018/0158260 A1    Jun. 7, 2018

(51) Int. Cl.
*B62D 6/00* (2006.01)
*G07C 5/08* (2006.01)
*G05D 1/02* (2006.01)
*B62D 15/02* (2006.01)

(52) U.S. Cl.
CPC ........... *G07C 5/0816* (2013.01); *B62D 6/002* (2013.01); *B62D 15/025* (2013.01); *B62D 15/026* (2013.01); *G05D 1/0291* (2013.01)

(58) Field of Classification Search
CPC ............................. G07C 5/0816; B62D 6/002
See application file for complete search history.

(56) References Cited

U.S. PATENT DOCUMENTS

| 7,698,031 | B2 | 4/2010 | Stevenson |
| 8,706,347 | B2 | 4/2014 | Bae et al. |
| 9,168,924 | B2 | 10/2015 | Lee et al. |
| 2001/0054524 | A1* | 12/2001 | Masters ............... B62D 13/005 180/400 |
| 2002/0059821 | A1* | 5/2002 | Ashrafi ................... B62D 6/04 73/117.02 |
| 2002/0188389 | A1* | 12/2002 | Ashrafi ................. G01M 17/06 701/41 |
| 2009/0079839 | A1* | 3/2009 | Fischer ................... G01S 7/003 348/218.1 |
| 2010/0256852 | A1* | 10/2010 | Mudalige ............... G08G 1/163 701/24 |
| 2011/0178671 | A1* | 7/2011 | Bae ........................ G01B 21/26 701/31.4 |
| 2012/0303397 | A1* | 11/2012 | Prosser ................. H02J 7/0054 705/7.12 |
| 2013/0190969 | A1* | 7/2013 | Harrill ................... G01B 21/26 701/34.4 |

(Continued)

FOREIGN PATENT DOCUMENTS

| EP | 0991046 A1 | 4/2000 |
| KR | 1020120116192 | 4/2014 |

OTHER PUBLICATIONS

UK Search Report dated May 4, 2018 re GB Appl. No. 1719473.5.

*Primary Examiner* — Jess Whittington
(74) *Attorney, Agent, or Firm* — Frank A. MacKenzie; Bejin Bieneman PLC (57) ABSTRACT

A reference vehicle is identified from data measuring changes in steering wheel angles of a plurality of vehicles. A target vehicle's steering wheel angle deviations is compared to steering wheel angle deviations of the reference vehicle A target vehicle component is actuated upon determining that a difference of the target vehicle's change of steering wheel angle and the reference vehicle's change of steering wheel angle exceeds a predetermined threshold.

20 Claims, 5 Drawing Sheets (56) References Cited

U.S. PATENT DOCUMENTS

| | | | |
|---|---|---|---|
| 2013/0253767 A1* | 9/2013 | Lee | B60W 50/04 |
| | | | 701/42 |
| 2015/0178998 A1* | 6/2015 | Attard | G07C 5/008 |
| | | | 701/23 |
| 2017/0103268 A1* | 4/2017 | Santamaria | B60W 40/12 |
| 2017/0122841 A1* | 5/2017 | Dudar | B60W 40/02 |
| 2018/0135989 A1* | 5/2018 | Schreier | G01C 21/3415 |

* cited by examiner

STEERING OPERATION

BACKGROUND

A misaligned wheel in a vehicle can cause the vehicle to turn away from a straight path. An operator of the vehicle can alter a steering wheel angle to compensate for the misaligned wheel. Furthermore, the misaligned wheel can increase wear on a vehicle tire. Often, an operator may be unaware that a vehicle wheel is misaligned.

DETAILED DESCRIPTION

A host vehicle can determine whether a target vehicle has a misaligned wheel based on steering wheel angle data of the target vehicle. The host vehicle can collect steering wheel angle data from a plurality of vehicles in, e.g., a platoon, and determine a reference vehicle that has a lowest steering wheel angle deviation. The host vehicle can compare the steering wheel angle data of the target vehicle to the steering wheel angle data of the reference vehicle. When the steering wheel angle deviation of the target vehicle differs from the steering wheel angle deviation of the reference vehicle by more than a predetermined deviation threshold, the host vehicle can determine that at least one of the wheels of the target vehicle is misaligned.

Figure 1:
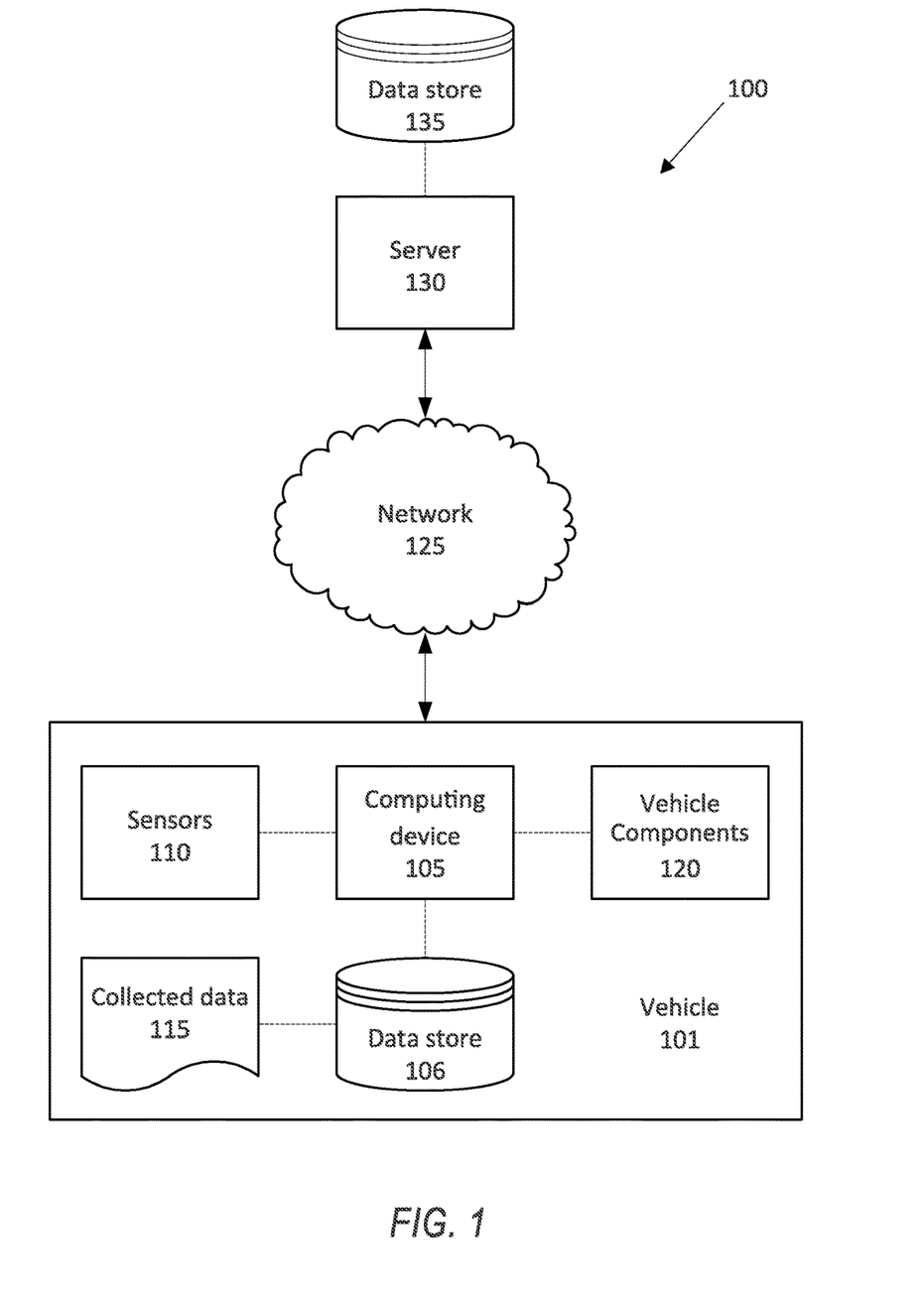
FIG. 1 is a block diagram of an example system for detecting a misaligned vehicle wheel.

FIG. 1 illustrates a system 100 for operating a vehicle 101. A computing device 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computing device 105 is generally programmed for communications on a vehicle 101 network, e.g., including a communications bus, as is known. Via the network, bus, and/or other wired or wireless mechanisms (e.g., a wired or wireless local area network in the vehicle 101), the computing device 105 may transmit messages to various devices in a vehicle 101 and/or receive messages from the various devices, e.g., controllers, actuators, sensors, etc., including sensors 110. Alternatively or additionally, in cases where the computing device 105 actually comprises multiple devices, the vehicle network may be used for communications between devices represented as the computing device 105 in this disclosure. In addition, the computing device 105 may be programmed for communicating with the network 125, which, as described below, may include various wired and/or wireless networking technologies, e.g., cellular, Bluetooth, wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, system and/or component status, etc. Further, other sensors 110 could include cameras, motion detectors, etc., i.e., sensors 110 to provide data 115 for evaluating a location of a target, projecting a path of a parking maneuver, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computing device 105, and/or at the server 130. In general, collected data 115 may include any data that may be gathered by the sensors 110 and/or computed from such data.

The vehicle 101 may include a plurality of components 120. The components 120 include, e.g., a propulsion (including, e.g., an engine, electric motors, etc.), transmission, vehicle seat, mirror, tiltable and/or telescoping steering wheel, steering rack, etc. The computing device 105 may actuate the components 120 to perform vehicle 101 functions, e.g., to stop the vehicle 101, to avoid targets, etc. The computing device 105 may be programmed to operate some or all of the components 120 with limited or no input from a human operator, i.e., in what is referred to as a "fully autonomous" mode. In the fully autonomous mode, that is, each or vehicle propulsion (e.g., including a powertrain with an electric motor and/or internal combustion engine), braking, and steering are controlled by the computing device 105. In a semi-autonomous mode, one or two of these may be controlled by the computing device 105.

When the computing device 105 operates the components 120 without human input in the fully autonomous mode, the computing device 105 can ignore input from the human operator with respect to components 120 selected for control by the computing device 105, which provides instructions, e.g., via a vehicle 101 communications bus and/or to electronic control units (ECUs) as are known, to actuate vehicle 101 components, e.g., to apply brakes, change a steering wheel angle, etc. For example, if the human operator attempts to turn a steering wheel 120 during a steering operation, the computing device 105 may ignore the movement of the steering wheel 120 and steer the vehicle 101 according to its programming.

The computing device 105 can be programmed to operate the steering wheel 120 autonomously, i.e., without input from a human operator. For example, the computing device 105 can be programmed to actuate the steering wheel 120 to keep the vehicle 101 in a roadway lane. The sensors 110 can detect when the vehicle 101 is about to leave a current roadway lane, and the computing device 105 can actuate the steering wheel 120 to a specified steering wheel angle to return the vehicle 101 to a center of the roadway lane. As used herein, the "steering wheel angle" refers to an angle to which a steering wheel 120 moves relative to a central axis, as is known. Moving the steering wheel 120 to the steering wheel angle turns a steering column and one or more components to turn one or more wheels to a "steering angle," the steering angle being the angle between the wheel and a front end of the vehicle 101. The ratio between the steering wheel angle and the steering angle is defined as the "steering ratio." If one or more wheels of the vehicle 101 are misaligned, the vehicle 101 may move out of the roadway lane even when the steering wheel 120 is fixed at a steering wheel angle of 0. That is, upon returning to the center of the roadway lane, the computing device 105 can actuate the steering wheel 120 to a steering wheel angle of 0, and the vehicle 101 can move toward an edge of the roadway lane. Thus, the computing device 105 may periodically actuate the steering wheel 120 to return the vehicle 101 to the center of the roadway lane.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
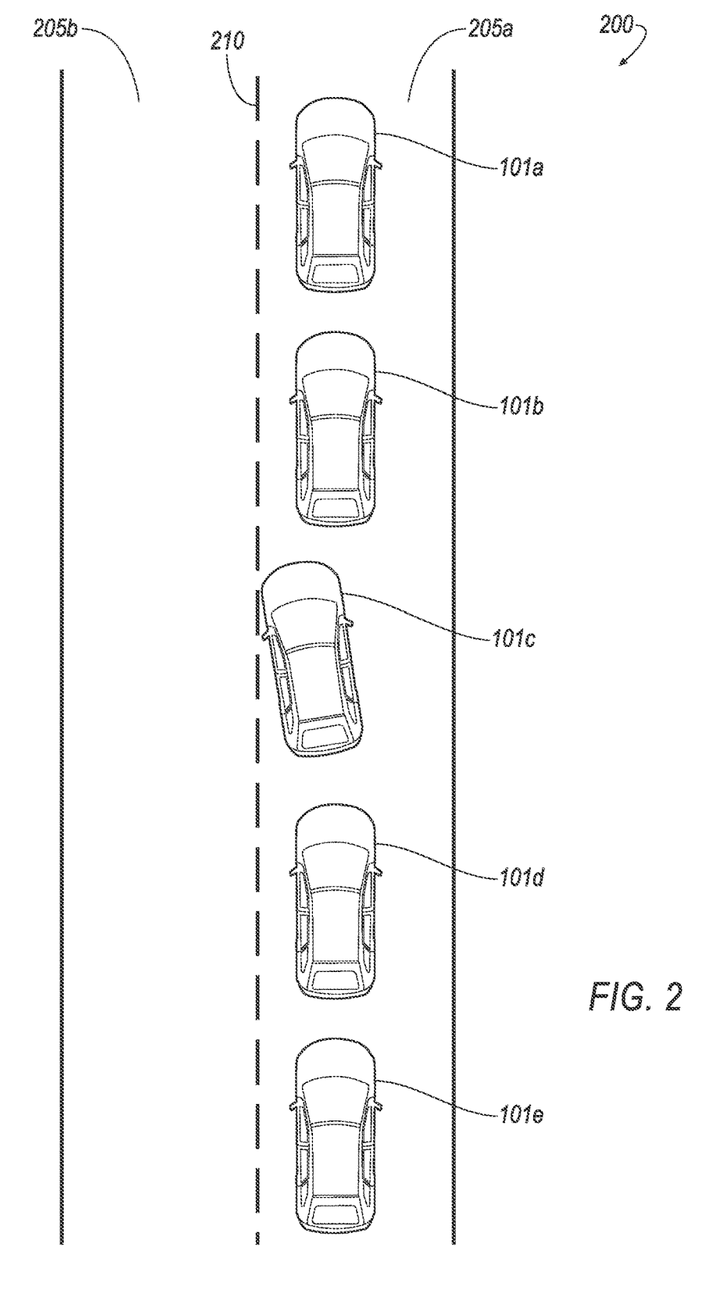
FIG. 2 illustrates a plurality of vehicles in an example platoon.

FIG. 2 illustrates a plurality of vehicles 101 in a platoon 200. The example of FIG. 2 has five vehicles 101*a*, 101*b*, 101*c*, 101*d*, 101*e*. The vehicles 101*a*-101*e* in the platoon 200 move in a roadway lane 205 with lane indicators 210, e.g., conventional painted stripes. Specifically, the lane indicators 210 define a first roadway lane 205*a* from a second roadway lane 205*b*. The computing devices 105*a*-105*e* of the vehicles 101*a*-101*e* actuate one or more components 120*a*-120*e* to move along the first roadway lane 205*a*.

One of the vehicles 101*a*-101*e* may have wheels that are misaligned, i.e., when a steering wheel angle of a steering wheel 120 is set to 0, the vehicle 101 veers away from a straight path. Thus, even though the computing device 105 may set a steering wheel angle of the steering wheel 120 to move straight in the roadway lane 205, the vehicle 101 may drift toward one of the lane indicators 210. For example, as shown in FIG. 2, the vehicle 101*c* is veering toward the lane indicator 210. The computing device 105*c* can actuate the steering wheel 120*c* when the vehicle 101*c* is within a predetermined distance threshold of the lane indicator 210, specifying a steering wheel angle to turn the vehicle 101*c* back toward a center of the first roadway lane 205*a*. However, if at least one of the wheels of the vehicle 101*c* is misaligned, the vehicle 101*c* can drift toward the lane indicator 210 upon reaching the center of the first roadway lane 205*a*.

Each computing device 105*a*-105*e* can collect steering data 115*a*-115*e* with one or more sensors 110*a*-110*e* and send the steering data 115*a*-115*e* over the network 125, e.g., via V2V. The steering data 115*a*-115*e* are measurements of the steering wheel angle for each of the vehicles 101*a*-101*e*, where the steering wheel angle is the angle of the steering wheel 120 as described above. Based on the steering data 115*a*-115*e*, one of the computing devices 105*a*-105*e* can determine whether one or more vehicles 101*a*-101*e* has a misaligned wheel. As described below, when the steering data 115*a*-115*e* for one of the vehicles 101*a*-101*e* indicates a periodic deviation from a straight path, one of the wheels of that vehicle 101*a*-101*e* may be misaligned. Alternatively or additionally, the computing devices 105*a*-105*e* can send the steering data 115 to the server 130, which can determine whether one of the vehicles 101*a*-101*e* has a misaligned wheel.

The steering data 115*a*-115*e* can be collected with the vehicles 101*a*-101*e* in the platoon 200 are moving along a substantially straight path. One of the vehicles 101*a*-101*e* in the platoon 200, e.g., a lead vehicle 101*a*, can determine a route that the vehicles 101*a*-101*e* in the platoon 200 follow. Alternatively or additionally, the server 130 can determine the route. The route can have portions that are curved (i.e., turns) and portions that are substantially straight. The computing devices 105*a*-105*e* can receive the predetermined route from, e.g., the server 130, and can determine a portion of the route is substantially straight. The portion can be substantially straight when a predicted steering wheel angle to move along the route is below a straightness threshold. For example, if the computing device 105*a* predicts that an upcoming portion of the route can be traveled with the steering wheel angle below, e.g., 5 degrees, the computing device 105*a* can determine that the portion is substantially straight. The computing devices 105*a*-105*e* can then collect the steering data 115*a*-115*e* along that substantially straight portion so that variations in the steering wheel angle data 115*a*-115*e* come from the steering wheels 120*a*-120*e*, and not from an increase in curvature in the road.

While FIG. 2 illustrates a plurality of vehicles 101 already in a platoon 200, a host vehicle 101 that is not currently in a platoon 200 can collect data 115 from other vehicles 101 to determine whether the host vehicle 101 has a misaligned wheel. The computing device 105 of the host vehicle 101 can determine that the steering wheel angle of the host vehicle 101 of exceeds a predetermined threshold. The computing device 105 of the host vehicle 101 can then determine that one or more of the wheels of the host vehicle 101 can be misaligned. The computing device 105 can request steering wheel angle data 115 from other vehicles 101 to determine whether one or more wheels of the host vehicle 101 is misaligned. For example, the host vehicle 101 can instruct one or more vehicles 101 to form a platoon 200 with the host vehicle 101. That is, the host vehicle 101 instructs the one or more vehicles 101 to move to a common roadway lane 205 along a substantially straight portion of a roadway. Upon forming the platoon 200, the computing device 105 of the host vehicle 101 can request steering wheel angle data 115 from the other vehicles 101 in the platoon and determine whether the host vehicle 101 has a misaligned wheel, as described below. Upon collecting the steering wheel angle data 115, the computing device 105 of the host vehicle 101 can send a second notification to the other vehicles 101 to disband the platoon 200. Alternatively or additionally, the computing device 105 of the host vehicle 101 can identify one or more vehicles 101 that are not in a platoon 200 and request steering wheel angle data 115 from the vehicles 101.

Figure 3:
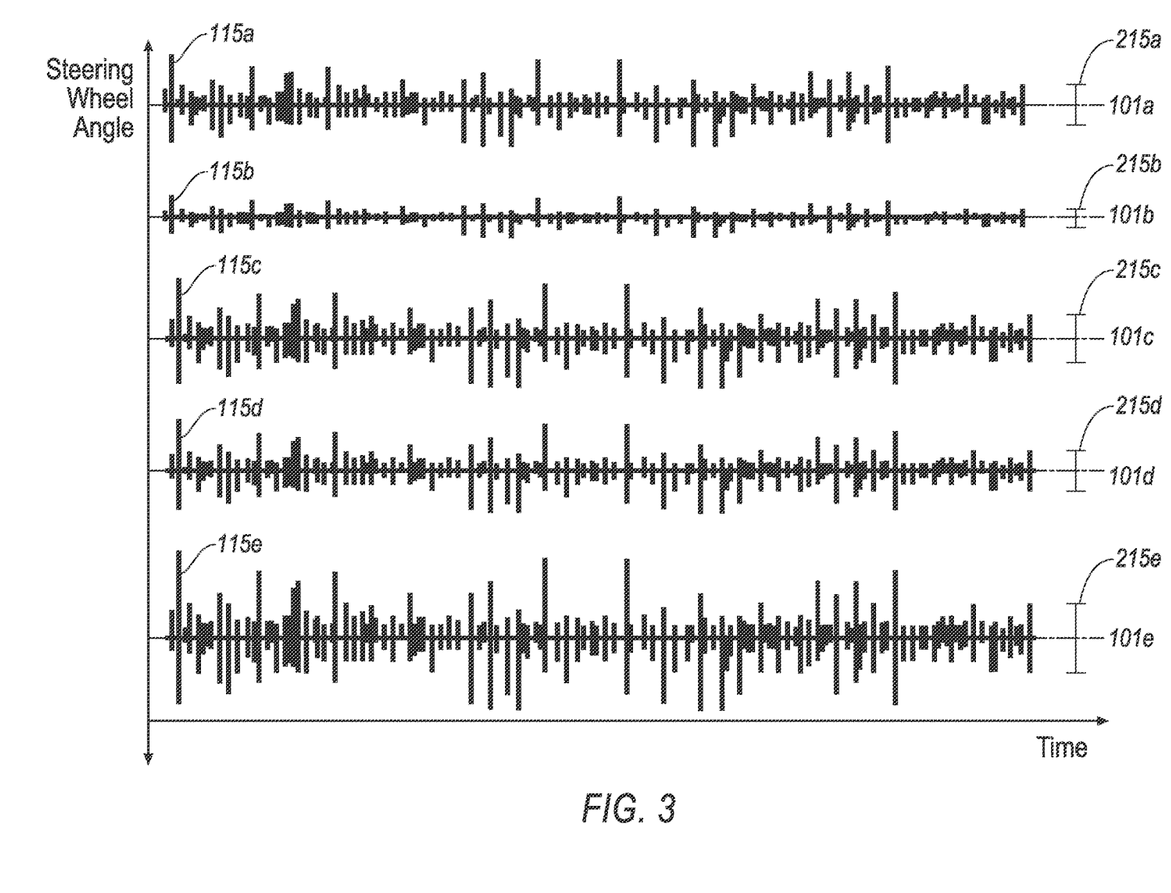
FIG. 3 illustrates example graphs of steering wheel angle data of the vehicles in a platoon.

FIG. 3 illustrates an example graph of steering wheel angle data 115*a*-115*e* for each of the vehicles 101*a*-101*e*. The horizontal axis indicates time, starting from a predetermined start point and ending after a predetermined number of seconds. The vertical axis indicates a steering wheel angle in degrees. For clarity, the steering wheel angle data 115a-115e for each vehicle 101a-101e is shown in five separate graphs arranged vertically. Each graph has a dashed line defining a steering wheel angle of 0 for the respective graph, and the plot shows a deviation of the steering wheel angle from 0. Each graph includes lines indicating the steering wheel angle data 115a-115e for each vehicle 101a-101e. The height of the line above or below the dashed line indicates the angle away from straight that the respective vehicle 101 moves. For example, steering wheel angle data 115 above the dashed line indicates that the vehicle 101 has moved to the left to the angle indicated by the height of the line above the dashed line.

The computing device 105 can determine a steering wheel angle deviation based on the steering wheel angle data 115. The steering wheel angle deviation is a measure of the magnitude of the steering wheel angle data 115 values and can indicate whether the vehicle 101 is drifting away from a straight path. That is, a steering wheel angle deviation above a specified threshold can indicate that the vehicle 101 has a misaligned wheel. The threshold for the steering wheel angle deviation can be set by the server 130 and predetermined based on e.g., steering data 115 collected through empirical testing of a test vehicle 101 with a misaligned wheel. An average steering wheel angle deviation 215 can be used to determine a reference vehicle 220. The average steering wheel angle deviation 215 can be determined by, e.g., determining a mean or a weighted mean of the steering wheel angle data 115, measuring a skewness of the distribution of the steering wheel angle data 115 (i.e., the distribution of the steering data 115 away from a Gaussian normal distribution as determined by a Pearson skewness test, as is known), measuring a peak-to-peak change in the steering wheel angle data 115, etc. In the example of FIG. 3, each set of steering wheel angle data 115a-115e has a respective average steering wheel angle deviation 215a-215e.

The computing device 105 can determine the vehicle 101 with the smallest average steering wheel angle deviation 215 as the reference vehicle 220. Because the reference vehicle 220 has the smallest average steering wheel angle deviation 215, the reference vehicle 220 is least likely to have misaligned wheels. Furthermore, variations in the steering wheel angle data 115 of the reference vehicle 220 can reflect changes in the roadway lanes 205 rather than misalignment of the vehicle 101 wheels. The computing device 105 can compare the steering wheel angle data 115 of the reference vehicle 220 to the steering wheel angle data 115 of another vehicle 101 (e.g., a target vehicle 101) to determine whether the vehicle 101 has a misaligned wheel.

The reference vehicle 220 allows the computing device 105 to determine whether changes in the steering wheel angle data 115 are the result of a misaligned wheel in a vehicle 101 or the characteristics of the roadway lane 205. That is, the roadway lane 205 may have variations in, e.g., road grade, curvature, roughness, potholes, etc., that require vehicle 101 to change their respective steering angles by actuating their respective steering wheels 120 to specified steering wheel angles. The reference vehicle 220 changes its steering wheel angle based on these variations and, as assumed in the context of the disclosed system and method, not because of a misaligned wheel. Thus, the computing device 105 can compare the steering wheel angle data 115 of other vehicles 101 in the platoon 200 to the reference vehicle 220 to determine whether a change in the steering wheel angle data 115 is a result of the variations in the roadway lane 205 or a result of a misaligned wheel.

The target vehicle 101 can message the computing device 105 of the host vehicle 101 to indicate that the target vehicle 101 has an adaptive steering apparatus. As used herein, an "adapting steering apparatus" refers to programming of the computing device 105 to control one or more components of the vehicle 101 that can change the steering ratio of the vehicle 101 based on a curvature of an upcoming portion of a roadway. The adaptive steering apparatus can include, e.g., a plurality of gears disposed between the steering wheel 120 and the steering column 120 that can be selectively actuated to change the steering ratio of the vehicle 101. The adaptive steering apparatus can adjust a steering ratio of the target vehicle 101 based on an upcoming increase in curvature in the roadway lane 205. Because the adaptive steering apparatus changes the steering ratio, the steering wheel angle data 115 can differ during the period when the steering wheel angle data 115 is collected. For example, if the steering ratio of the target vehicle 101 increases, the steering wheel angle data 115 would decrease, as the adaptive steering apparatus increases the steering ratio to produce a greater turn of the wheels of the target vehicle 101 for a smaller steering wheel angle. The computing device 105 of the host vehicle 101 can receive the steering ratios prescribed by the adaptive steering apparatus of the target vehicle 101 and adjust the steering data 115 to account for the differing steering ratios. For example, if the steering ratio of the target vehicle 101 decreases when the steering wheel angle data 115 are collected, the computing device 105 of the host vehicle 101 can apply a multiplier to the steering wheel angle data 115 after the steering ratio decreases to scale the steering wheel angle data 115 to a common steering ratio.

Figure 4:
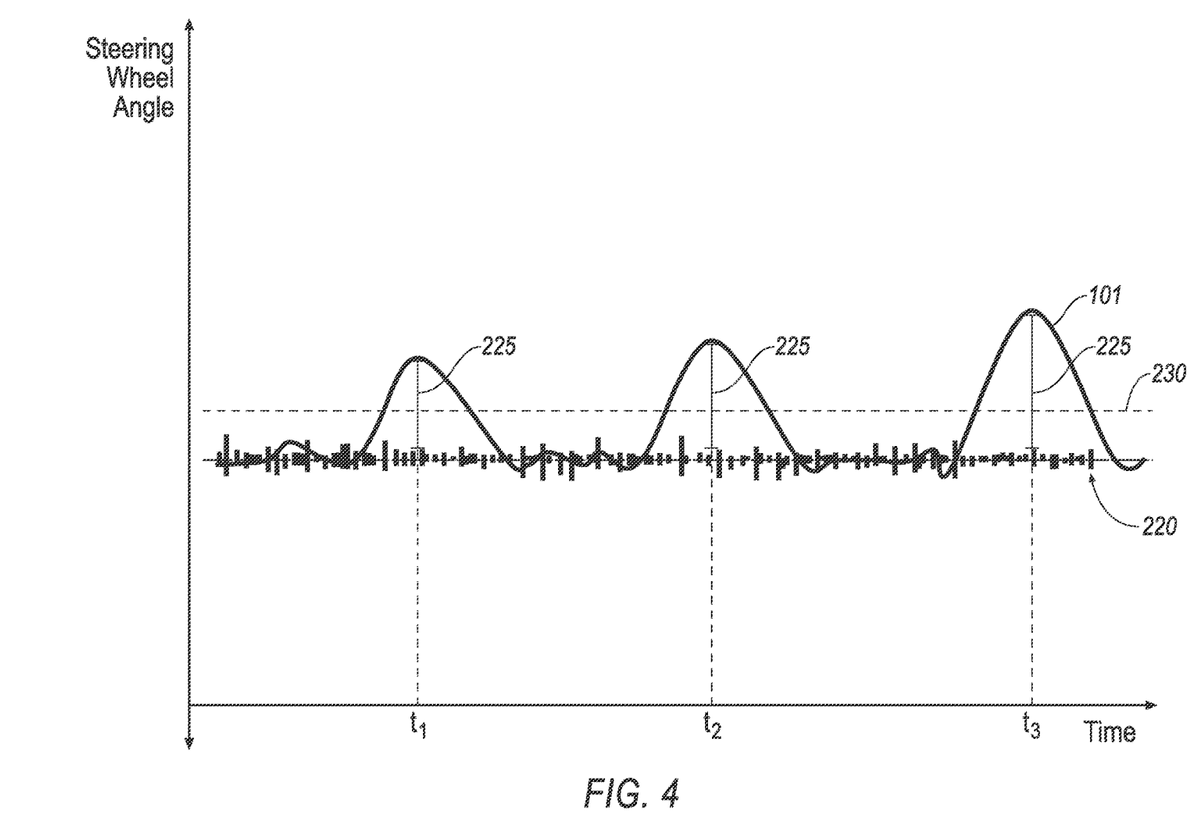
FIG. 4 illustrates an example graph of steering wheel angle data of a target vehicle compared to steering wheel angle data of a reference vehicle.

FIG. 4 illustrates an example comparison of steering data 115 for a target vehicle 101 in the platoon 200 to the reference vehicle 220. As described above, the reference vehicle 220 is the vehicle 101 in the platoon 200 that has the lowest steering wheel angle deviation. By comparing the steering wheel angle data 115 of the target vehicle 101 to the reference vehicle 220, the computing device 105 can detect a potential wheel misalignment in the target vehicle 101. The vertical axis plots the steering wheel angle, and the horizontal axis plots time.

As shown in FIG. 4, the computing device 105 can determine a difference 225 between the steering wheel angle deviation of the target vehicle 101 and the steering wheel angle deviation of the reference vehicle 220. The difference 225 illustrates how much the steering wheel angle of the target vehicle 101 differs from the steering wheel angle of the reference vehicle 220 at a given time. Thus, the difference 225 indicates whether the target vehicle 101 is turning more than the reference vehicle 220. When the difference is greater than a deviation threshold 230, the computing device 105 can determine that the target vehicle 101 has a wheel misalignment. The computing device 105 can message the computing device 105 of the target vehicle 101 indicating the wheel misalignment.

The computing device 105 can detect a wheel misalignment from the steering wheel angle deviation when the target vehicle 101 performs a periodic steering correction. When a wheel in the target vehicle 101 is misaligned, the computing device 105 of the target vehicle 101 may repeatedly adjust the steering wheel angle at regular intervals to maintain the target vehicle 101 in the roadway lane 205. Thus, as used herein, a "periodic steering correction" refers to a plurality of changes in the steering wheel angle deviation that occur at substantially similar intervals of time (i.e., periods). That is, a periodic steering correction occurs when the time interval between the plurality of changes in the steering wheel angle deviation occurs is substantially the same. This regular, periodic correction of the steering wheel angle can result from a misaligned wheel. The computing device 105 of the host vehicle 101 can message the computing device 105 of the target vehicle 101 when a periodic steering correction is detected, indicating a misaligned wheel.

For example, as shown in FIG. 4, the target vehicle 101 has three increases in the steering wheel angle deviation above the deviation threshold 230 with peaks at times $t_1$, $t_2$, $t_3$. These increases in the steering wheel angle deviation can be caused by a sensor 110 detecting that the target vehicle 101 is leaving the roadway lane 205 and the computing device 105 actuating the steering wheel 120 to correct the steering wheel angle to move the target vehicle 101 back into the center of the roadway lane 205. If the differences between the times $t_1$, $t_2$, $t_3$ are substantially similar, the computing device 105 can determine that the steering wheel angle deviation is a periodic steering correction. When the target vehicle 101 performs the periodic steering correction, the computing device 105 can determine that the target vehicle 101 has a misaligned wheel. While the example of FIG. 4 shows a periodic steering correction with three example times where the steering wheel angle exceeds the deviation threshold 230, the computing device 105 of the host vehicle 101 can determine that the steering wheel angle deviations are a periodic steering correction based on a different number of times, e.g., 4 times, 5 times, etc.

When the computing device 105 of the host vehicle 101 determines that the target vehicle 101 has a misaligned wheel, the computing device 105 of the host vehicle 101 can instruct the computing device 105 of the target vehicle 101 to move the target vehicle 101 to a repair location. The computing device 105 of the host vehicle 101 can receive a plurality of repair locations from, e.g., the server 130, and instruct the computing device 105 of the target vehicle 101 to identify one of the repair locations and to move the target vehicle 101 to the repair location. Alternatively or additionally, the computing device 105 of the host vehicle 101 can message the computing device 105 of the target vehicle 101 including instructions to identify the repair location and to move the target vehicle to the repair location. The computing devices 105 of the host vehicle 101 and/or the target vehicle 101 can message the identified repair location indicating that the target vehicle 101 has a misaligned wheel.

Figure 5:
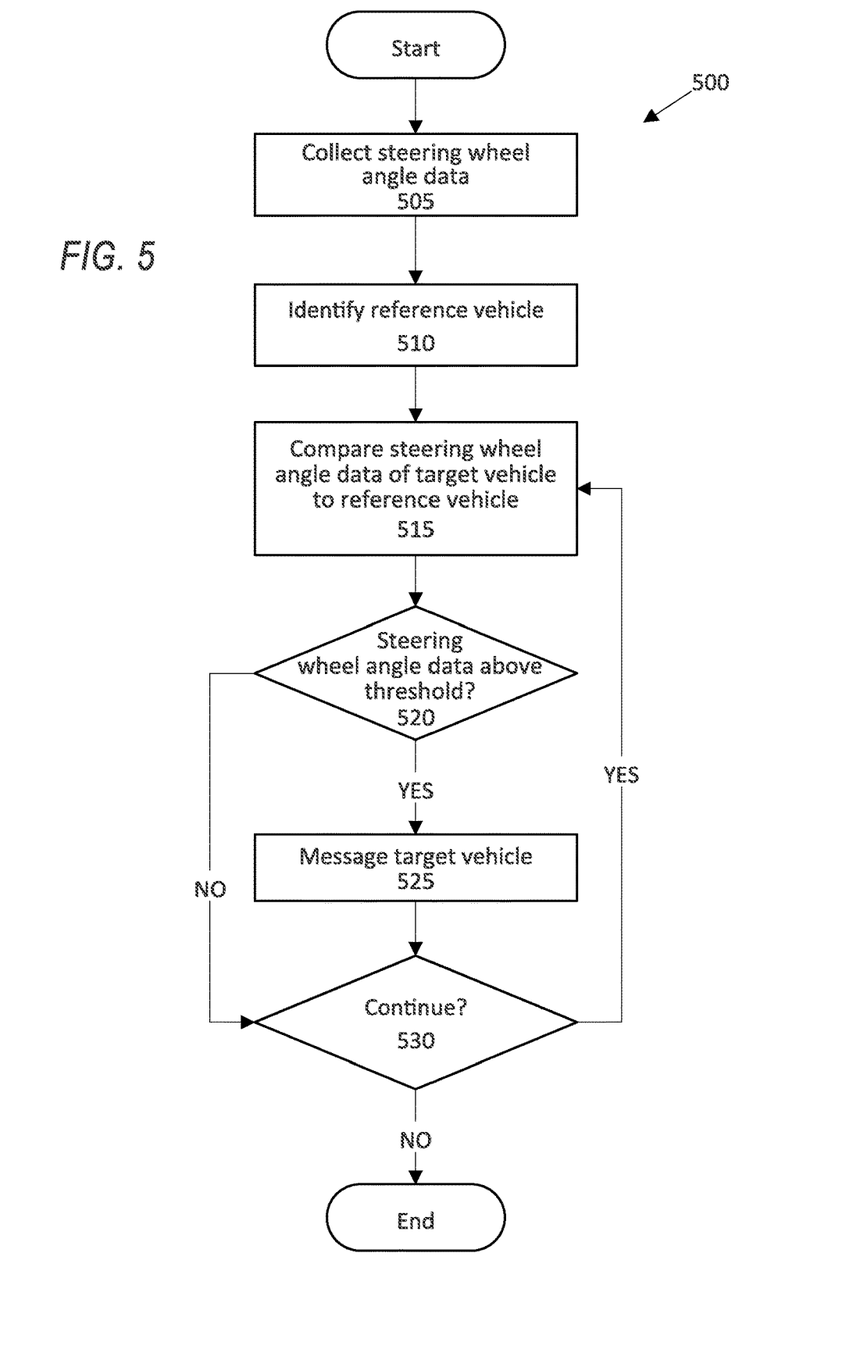
FIG. 5 is a block diagram of an example process for detecting the misaligned wheel.

FIG. 5 illustrates a process 500 for detecting a wheel misalignment in a vehicle 101. The process 500 begins in a block 505, in which a computing device 105 of a host vehicle 101 collects steering wheel angle data 115 from a plurality of vehicles 101, e.g., the vehicles 101 in a platoon 200. Each computing device 105 in the vehicles 101 of the platoon 200 can share the steering wheel angle data 115 with the other computing devices 105 in the platoon 200.

Next, in a block 510, the computing device 105 of the host vehicle 101 identifies a reference vehicle 220 based on the steering wheel angle data 115. As described above, the reference vehicle 220 is the vehicle 101 having the lowest average steering wheel angle deviation 215. That is, the vehicle 101 with the lowest average steering wheel angle deviation 215 is least likely to have a misaligned wheel, and the steering wheel angle deviations of the other vehicles 101 can be compared to the reference vehicle 220 to see if the other vehicles 101 are drifting out of the roadway lane 205.

Next, in a block 515, the computing device 105 of the host vehicle 101 compares the steering wheel angle data 115 of a target vehicle 101 to the reference vehicle 220. The target vehicle 101 is one of the other vehicles 101 in the platoon 200. The computing device 105 of the host vehicle 101 determines a difference between a magnitude of the steering wheel angle deviation of the target vehicle 101 to a magnitude of the steering wheel angle deviation of the reference vehicle 220.

Next, in a block 520, the computing device 105 of the host vehicle 101 determines whether the difference between the steering wheel angle deviation of the target vehicle 101 and the steering wheel angle deviation of the reference vehicle 220 is above a predetermined threshold. When the difference is above the threshold, the target vehicle 101 is correcting the steering in a manner that predicts that one of the wheels of the target vehicle 101 is misaligned. If the difference is above the threshold, the process 500 continues in a block 525. Otherwise, the process 500 continues in a block 530.

In the block 525, the computing device 105 of the host vehicle 101 messages the computing device 105 of the target vehicle 101 predicting that one of the wheels is misaligned. The computing device 105 of the target vehicle 101 may perform countermeasures to correct the misalignment, e.g., the computing device 105 of the target vehicle 101 may identify a repair location and actuate one or more components 120 to move the target vehicle 101 to the repair location.

In the block 530, the computing device 105 of the host vehicle 101 determines whether to continue the process 500. For example, the host vehicle 101 can leave the platoon 200, and the computing device 105 determines not to continue the process 500. In another example, the computing device 105 of the host vehicle 101 can identify another target vehicle 101 and continue the process 500. If the computing device 105 determines to continue the process 500, the process 500 returns to the block 515. Otherwise, the process 500 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the processor to:
    identify, from a plurality of vehicles, a vehicle having a smallest average steering wheel angle deviation of each of the plurality of vehicles;
    compare a target vehicle's steering wheel angle deviations to the identified vehicle's steering wheel angle deviations; and
    actuate a target vehicle component upon determining that a difference of the target vehicle's steering wheel angle deviation and the identified vehicle's steering wheel angle deviation exceeds a predetermined threshold.

2. The system of claim 1, wherein the instructions further include instructions to instruct the target vehicle to, upon determining that the difference exceeds the threshold, identify a repair location and actuate at least the component to move the target vehicle to the repair location.

3. The system of claim 1, wherein the instructions further include instructions to identify whether the steering wheel angle data of the target vehicle indicate a periodic steering correction, the periodic steering correction being more than one steering wheel angle deviation above a steering threshold having a substantially same period of time between the steering wheel angle deviations.

4. The system of claim 3, wherein the instructions further include instructions to message the target vehicle when the steering wheel angle data of the target vehicle indicate the periodic steering correction.

5. The system of claim 1, wherein the computer is further programmed to determine that the target vehicle has one or more misaligned wheels based at least in part on the steering wheel angle deviation of the target vehicle.

6. The system of claim 5, wherein the computer is further programmed to instruct the target vehicle to message a repair location indicating a misaligned wheel of the target vehicle.

7. The system of claim 1, wherein the computer is further programmed to identify a portion of a predetermined route of the plurality of vehicles that is substantially straight and to collect the steering wheel angle data when the vehicles are moving along the identified portion.

8. The system of claim 7, wherein the route portion is determined to be substantially straight when a specified steering wheel angle for the route portion remains below a straightness threshold along the route portion.

9. The system of claim 1, wherein the instructions further include instructions to receive a message from the target vehicle indicating that the target vehicle has an adaptive steering apparatus and to determine the steering wheel angle deviation of the target vehicle based at least in part on the adaptive steering apparatus.

10. The system of claim 1, wherein the instructions further include instructions to instruct the plurality of vehicles to form a platoon.

11. A method, comprising:
    identifying, from a plurality of vehicles, a vehicle having a smallest average steering wheel angle deviation of each of the plurality of vehicles;
    comparing a target vehicle's steering wheel angle deviations to the identified vehicle's steering wheel angle deviations; and
    actuating a target vehicle component upon determining that a difference of the target vehicle's steering wheel angle deviation and the identified vehicle's steering wheel angle deviation exceeds a predetermined threshold.

12. The method of claim 11, further comprising instructing the target vehicle to upon determining that the difference exceeds the threshold, identify a repair location and actuate at least the component to move the target vehicle to the repair location.

13. The method of claim 11, further comprising identifying whether the steering wheel angle data of the target vehicle indicate a periodic steering correction, the periodic steering correction being more than one steering wheel angle deviation above a steering threshold having a substantially same period of time between the steering wheel angle deviations.

14. The method of claim 13, further comprising messaging the target vehicle when the steering wheel angle data of the target vehicle indicate the periodic steering correction.

15. The method of claim 11, further comprising determining that the target vehicle has one or more misaligned wheels based at least in part on the steering wheel angle deviation of the target vehicle.

16. The method of claim 15, further comprising instructing the target vehicle to message repair location indicating a misaligned wheel of the target vehicle.

17. The method of claim 11, further comprising identifying a portion along a predetermined route of the plurality of vehicles that is substantially straight and collecting the steering wheel angle data when the vehicles are moving along the identified portion.

18. The method of claim 17, wherein the route portion is determined substantially straight when a specified steering wheel angle for the route portion remains below a straightness threshold along the route portion.

19. The method of claim 11, further comprising receiving a message from the target vehicle indicating that the target vehicle has an adaptive steering apparatus and determining the steering wheel angle deviation of the target vehicle based at least in part on the adaptive steering apparatus.

20. The method of claim 11, further comprising instructing the plurality of vehicles to form a platoon.

* * * * *